L. King.
Fire Escape.
No. 28,378. Patented May 22, 1860.
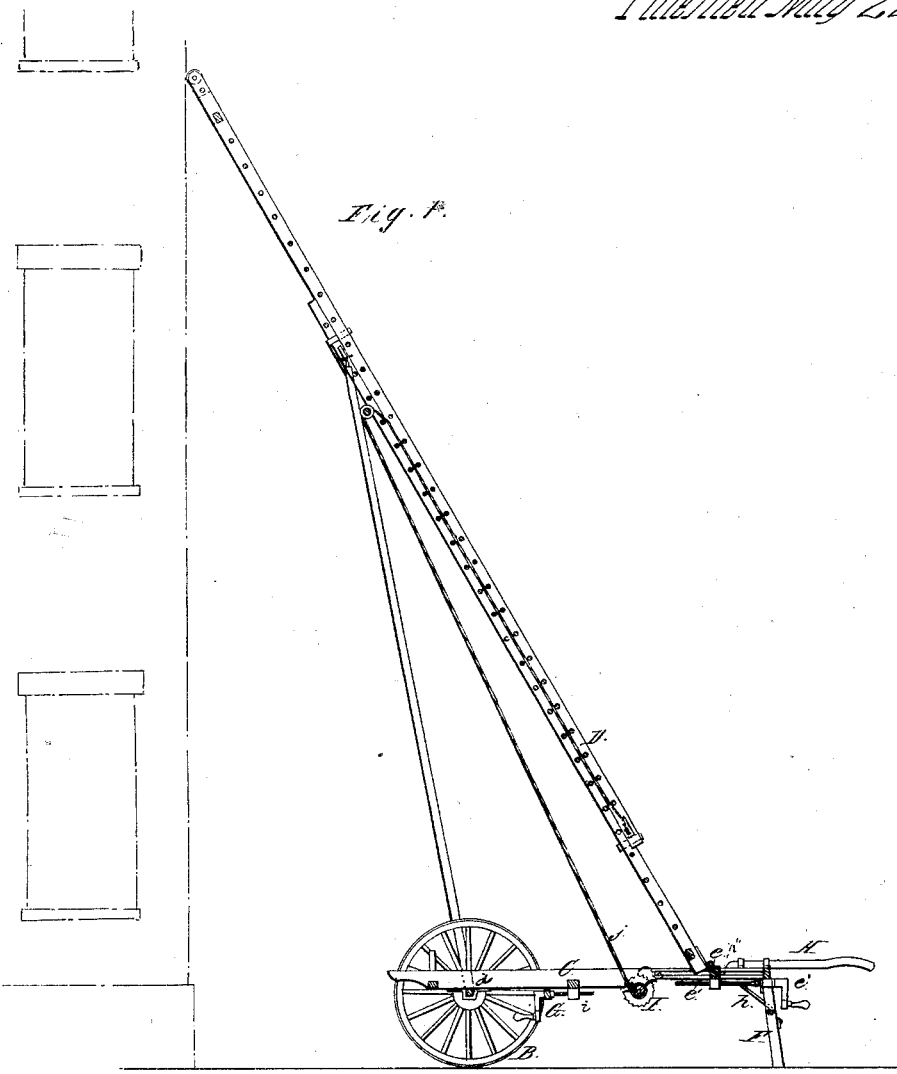
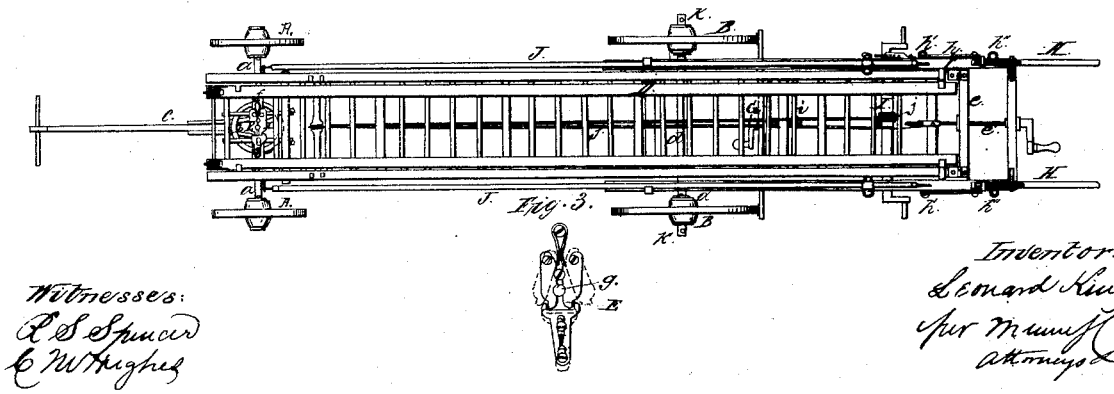

UNITED STATES PATENT OFFICE.

LEONARD KING, OF BRIDGEPORT, CONNECTICUT.

FIRE-ESCAPE.

Specification of Letters Patent No. 28,378, dated May 22, 1860

*To all whom it may concern:*

Be it known that I, LEONARD KING, of Bridgeport, in the county of Fairfield and State of Connecticut, have invented a new and Improved Fire-Escape; and I do hereby declare that the following is a full, clear, and exact description of the same, reference being had to the accompanying drawing, forming a part of this specification, in which—

Figure 1, represents a longitudinal vertical section of my escape when elevated and ready for use. Fig. 2, a plan or top view of the same, when lowered and ready to be drawn from place to place. Fig. 3, an enlarged view of the catch used for fastening the ladders to the forewheels.

Similar letters of reference in the three figures indicate corresponding parts.

This invention consists, 1st, in the employment of the ladders in place of the reach for the purpose of connecting the hind wheels of the truck to the forewheels; 2nd, in arranging the frame which rests on the rearwheels with two hinged legs in combination with a brake in such a manner, that when the brake is applied to the wheels and the legs are turned down, the whole frame stands perfectly firm; 3rd, in the arrangement in combination with the ladders of a sliding head, for the purpose of adjusting the inclination of the ladders; 4th, in the arrangement of sockets on the ends of the axle of the hindwheels to receive the pointed ends of the braces which support the ladders when the same are elevated, in such a manner that the entire weight of the ladders is supported by the hind wheels, and the frame in which they work; 5th, in the general arrangement and combination of the parts which will be hereinafter more fully described and explained.

To enable those skilled in the art to make and use my invention, I will proceed to describe the same, with reference to the drawing.

The truck which supports my ladders, consists of the two forewheels A, arranged on the axle $a$, with the fifth wheel $b$ and the draft pole $c$, in the usual manner, and of the hind wheels B, which are attached to an axle $d$, that supports the frame C, which extends in the rear of said hind wheels. The ladders D are hinged to a cross-bar $e$, which slides in a longitudinal direction in the frame C, and one of the rounds of the upper ladder, and situated near to its top end is made of an increased size, so as to admit the king bolt $g$, which is secured to the ladder by means of a spring catch E, or in any other suitable and convenient manner. By these means, the ladders take the place of the reach, no other connection being required for the hind, and the fore wheels.

The frame C, is furnished with legs F, which are hinged to its rear-end. When the ladders are lowered as shown in Fig. 2, these legs are turned up and secured to the sides of the frame by means of hooks $h$, catching in loops $h'$, but if the ladders are elevated, the legs are turned down as shown in Fig. 1, and they are now fastened in their position by the same hooks $h$, catching in loops $h''$. At the same time the hind wheels B, can be prevented from turning by means of a brake G, which is operated by a screw $i$, or in any other convenient manner, and if the wheels are thus fastened and the legs F are turned down, the frame C is rendered perfectly steady, so that the men can ascend and descend on the ladder with perfect safety. Handles H, slipped into suitable sockets attached to the rear end of the frame C, serve to give to the ladders the proper direction, when the same are elevated and to be used.

The cross-bar or head $e$ which slides in the sides of the frame C, is operated by a screw $e'$ and when the ladders are elevated, by turning this screw in one direction, or in the other, the inclination of the ladders is increased and diminished which is of great advantage in narrow streets and in order to adapt the ladders to different heights. A windlass I, with a rope $j$ serves to extend the ladders when it is desirable. When the ladders are elevated they are supported by braces J, which are hinged to the sides of the main ladder in the usual manner. But instead of placing these braces down on the ground when the ladders are up, I have provided for sockets $k$, in the ends of axle $d$, of the hind wheels which serve to receive the pointed ends of said braces, so that by taking hold of the handle H, the frame C, together with the ladders in an elevated position can be trundled from place to place with the greatest facility. The operation will be readily understood.

When the ladders are not used they are lowered down, and their top end is supported by the fore-wheels A, being secured to the same by means of the spring catch E, catching over the king-bolt $g$. In this position the ladders are brought to the place where they are required, in case of fire, and when arrived the king bolt is released, and the forewheels are disengaged in a few seconds. The ladders are now elevated by the aid of the braces J, and when the latter are secured in the sockets $k$, in the ends of the axle $d$, the hind-wheels together with the frame C, support the entire weight of the ladders, and it is easy to bring the same to the required spot and adjust the ladders as occasion may require.

This arrangement combines the advantages of the common hook and ladder truck with those of the fire escape, known as the London fire escape; the latter is always in an elevated position, which not only renders it difficult to house the same, but in many cases it is impossible to approach with the elevated ladder close to the spot where the same is needed. My ladder can be elevated in a few seconds, and it can be adjusted to the desired inclination and brought to any place where it may be needed.

What I claim as new and desire to secure by Letters Patent is,

1. The employment of the ladders D, in place of the reach for connecting the fore wheels A and the hind wheels, substantially in the manner described.

2. The combination of the hinged legs F, and brake G, substantially as described, for the purpose of securing the hind wheels with the frame C, in the desired place and position.

3. The arrangement, in combination with the ladders D, of the sliding head $e$, operated by a screw $e'$ substantially as, and for the purpose specified.

4. The arrangement of the sockets $k$, in the ends of the axle $d$, of the hind-wheels in combination with the braces J, constructed and operating substantially as and for the purpose set forth.

5. The arrangement and combination of the forewheels A, catch E, ladders D, hindwheels B, and frame C, substantially as and for the purpose described.

LEONARD KING.

Witnesses:
T. TEUFEL,
JOSHUA LORD.